(12) United States Patent
Tanygin (10) Patent No.: US 7,609,907 B2
(45) Date of Patent: Oct. 27, 2009

(54) VISUALIZATION OF FIELD OF VIEW CONSTRAINTS

(75) Inventor: Sergei Tanygin, Malvern, PA (US)

(73) Assignee: Analytical Graphics Inc., Exton, PA (US)

( * ) Notice: Subject to any disclaimer, the term of this patent is extended or adjusted under 35 U.S.C. 154(b) by 688 days.

(21) Appl. No.: 11/448,542

(22) Filed: Jun. 7, 2006

(65) Prior Publication Data

US 2007/0286491 A1  Dec. 13, 2007

(51) Int. Cl.
G06K 9/40 (2006.01)
(52) U.S. Cl. .................... 382/266; 382/274; 382/275
(58) Field of Classification Search ................ 382/260, 382/266, 269, 274, 275
See application file for complete search history.

(56) References Cited

U.S. PATENT DOCUMENTS

| 5,469,536 | A | 11/1995 | Blank |
| 6,283,471 | B1 * | 9/2001 | Kunzel et al. ............... 271/227 |
| 6,404,462 | B1 * | 6/2002 | George ........................ 348/806 |
| 6,490,048 | B1 * | 12/2002 | Rudd et al. .................. 356/601 |
| 6,583,884 | B2 * | 6/2003 | Rudd et al. .................. 356/601 |
| 6,850,875 | B1 | 2/2005 | Claffey et al. |
| 7,181,081 | B2 * | 2/2007 | Sandrew ..................... 382/254 |

* cited by examiner

*Primary Examiner*—Yosef Kassa
(74) *Attorney, Agent, or Firm*—The Marbury Law Group, PLLC (57) ABSTRACT

A "field of view" (FOV) consists of all possible directions along which scalar valued functions satisfy selected thresholds. This combination of a scalar function and a threshold is called a FOV constraint and a method is used to compute one or more directional contours or horizons that encompass regions of space that comprise FOV. The method is independent from the nature or the number of FOV constraints. If a single constraint produces multiple regions or regions with holes, the constraint is preferably redefined as a set of several simpler constituent constraints combined using logical AND operations. Each constituent constraint produces a single closed boundary contour with constraint region inside or outside of the contour.

11 Claims, 13 Drawing Sheets

- ■ - 0 index point
- ⊞ - index of crossing point
- ▲ - test point

VISUALIZATION OF FIELD OF VIEW CONSTRAINTS

RELATED APPLICATIONS

This application claims the benefit of Provisional Application No. 60/605,072, filed Aug. 27, 2004 and hereby incorporated by reference.

BACKGROUND OF THE INVENTION

The present invention is drawn to the visualization of field of view constraints. More particularly, the invention is drawn to the visualization of sensor field of view based upon computing and visualizing the effect of constraints upon the sensor field of view.

In many fields, the knowledge of what is in a field of view of a sensor, satellite, or other such instrument can be very useful and a graphic display, typically of a two-dimensional (2D) projection of a three-dimensional (3D) field of view, can assist a user in evaluating the sufficiency of the field of view. For example, a sensor mounted on an aircraft may have a conical field of view that will be obscured or constrained by physical features of the aircraft, celestial bodies that interfere with the sensor, topographical features, etc. Additionally, for line-of-sight communications, it can be useful to be able to determine whether a particular location of one communication device is in the field of view of other communication devices.

The present invention is embodied in the Satellite Tool Kit/Visualization Option Version 6.0 (STKVO 6.0) available from Analytical Graphics, Inc. of Malvern, Pa. While previous versions of STK have included features for the visualization of field of view and have computed constraints, none of the prior versions of STK have included the computing and visualizing of the effect of constraints on sensor field of view found in the present invention. There are also many constraints included in STKVO 6.0 that have been developed for various objects, including but not limited to: Satellite, Missile, Launch Vehicle, Aircraft, Ground Vehicle, Ship, Facility, Target, Area Target, Line Target, Sensor, Transmitter, Receiver, and Radar.

BRIEF SUMMARY OF THE INVENTION

The "field of view" (FOV) in the context of the present invention consists of all possible directions along which scalar valued functions satisfy selected thresholds. This combination of a scalar function and a threshold is called a FOV constraint. Some FOV constraints can be related to directions explicitly, e.g. angle off boresight, azimuth and elevation in some coordinate frame, etc. Dependence of others FOV constraints on directions can be more implicit, e.g. ground sample distance (GSD), which depends on the ground elevation angle and focal length.

In a preferred embodiment, an algorithm within the present invention computes one or more directional contours or horizons that encompass regions of space that comprise FOV. The algorithm is independent from the nature or the number of FOV constraints. If a single constraint produces multiple regions or regions with holes, the constraint is preferably redefined as a set of several simpler constituent constraints combined using logical AND operations. Each constituent constraint produces a single closed boundary contour with constraint region inside or outside of the contour.

For brevity, in the subsequent discussion, the term "constraint" will be used in place of the term "constituent FOV constraint." Also, in order to better accommodate 2D illustrations of 3D concepts, directional contours will be represented as 2D curves or arcs and directions themselves will be referred to as points. As such, as used herein and in the claims, the term point refers to both 2D points and 3D directions and the term arc refers to both 2D curves and 3D directional contours.

DETAILED DESCRIPTION OF THE INVENTION

In an embodiment, an algorithm in accordance with the present invention computes one or more directional contours or horizons that encompass regions of space that comprise FOV. The algorithm is independent from the nature or the number of FOV constraints. If a single constraint produces multiple regions or regions with holes, the constraint is preferably redefined as a set of several simpler constituent constraints combined using logical AND operations. Each constituent constraint produces a single closed boundary contour with constraint region inside or outside of the contour.

The process of visualizing FOV constraints preferably uses various inputs to define the constraints.

Inputs to the Process

Each constraint supplies the following to the algorithm:
Value Procedure—procedure that determines if a given point is inside this constraint's region;
Index Procedure—procedure that returns contour index for a given point, which is a real value that unambiguously encodes points on the constraint's boundary contour; encoding must be continuous and index must take on values from 0 to some defined maximum value; and
Sampling Procedure—procedure that returns an ordered array of sampled points that adequately capture an arc of the constraint's boundary contour between two specified contour indices.

These inputs are not, however, meant as a limitation.

Figure 1:
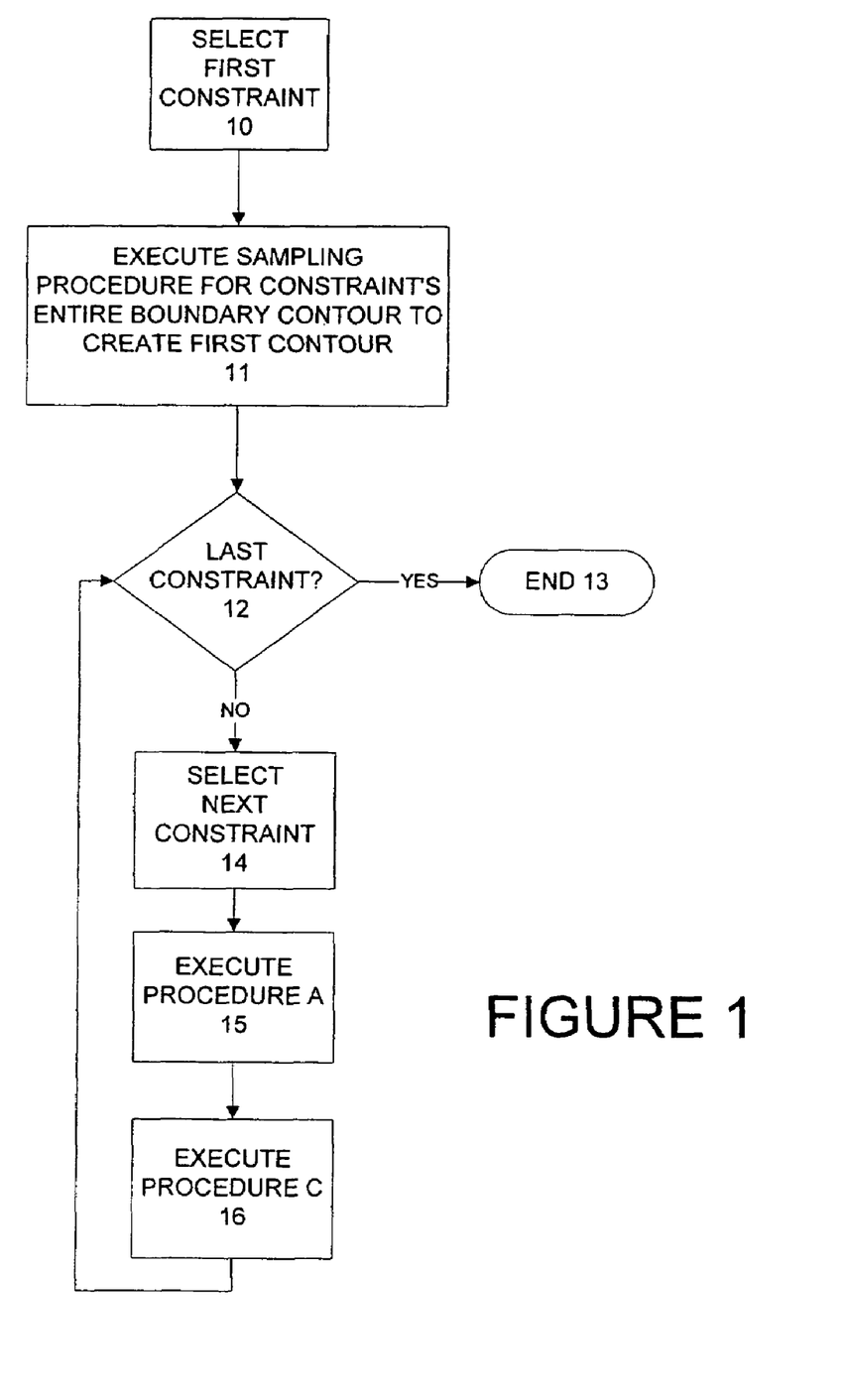
FIG. 1 illustrates a basic embodiment of an algorithm in accordance with the present invention.

As illustrated in FIG. 1, an algorithm in accordance with an embodiment of the present invention can be summarized as follows:
1. Select first constraint 10;
2. Execute the appropriate Sampling Procedure for this constraint's entire boundary contour to create first contour 11;
3. If this is last constraint at 12, go to end 13;
4. Select next constraint 14;
5. Execute Procedure A (discussed below) 15;
6. Execute Procedure C (discussed below) 16;
7. Go to step 3, above.

Figure 2:
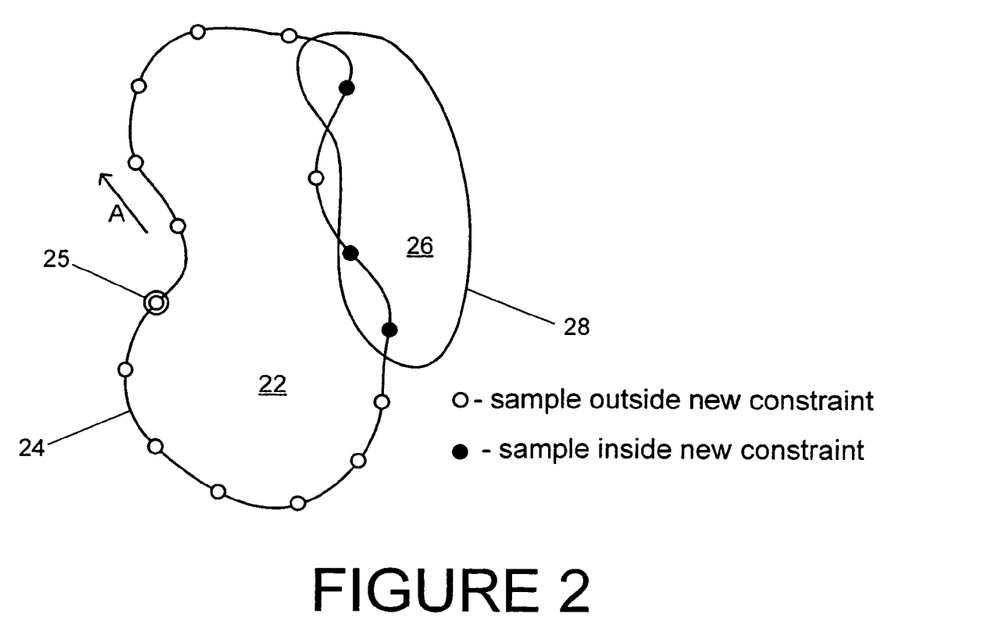
FIGS. 2-5 illustrate the case (in 2D) for computing the FOV in accordance with an embodiment of the present invention where crossings exist between an existing contour and a new constraint region.
Figure 3:
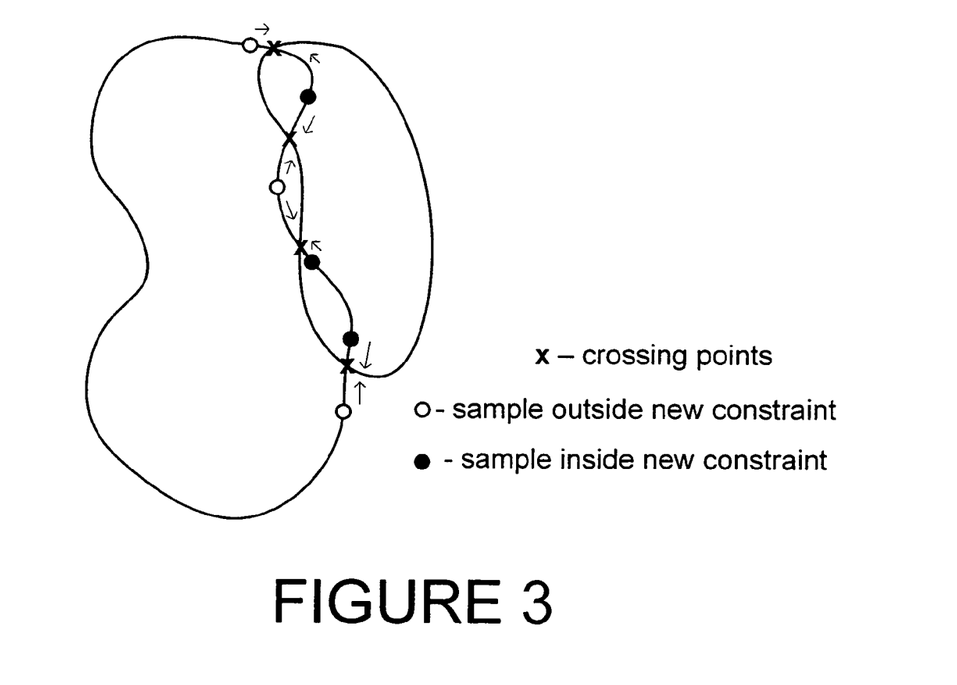
Figure 4A:
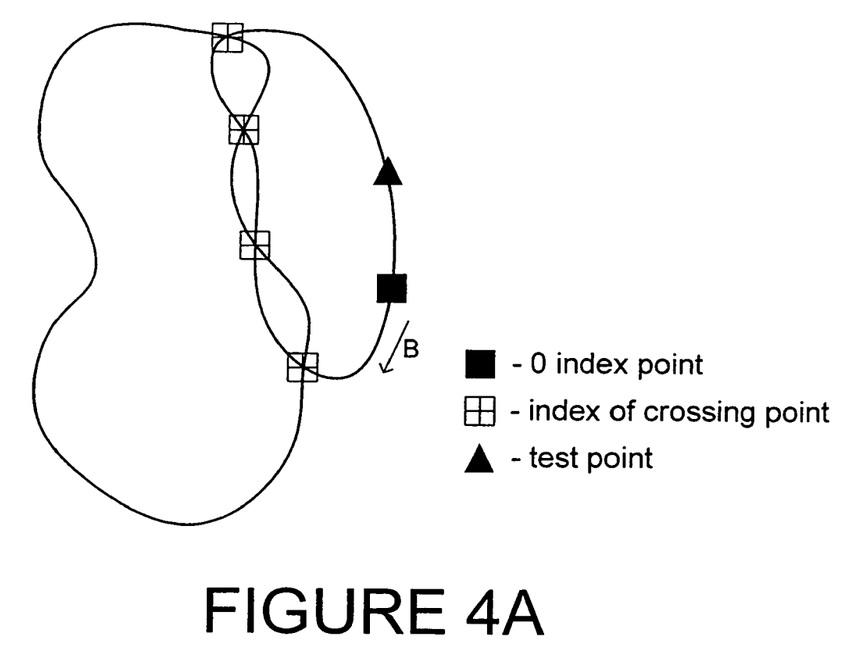
Figure 4B:
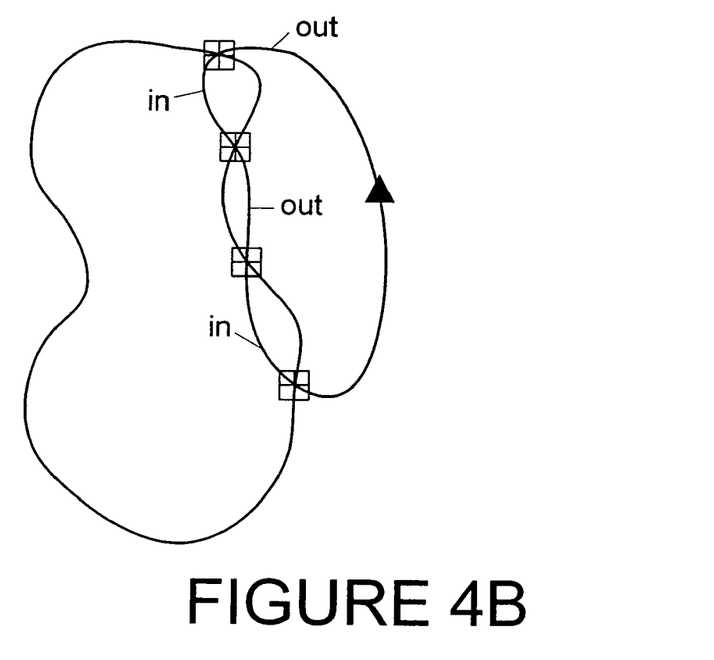
Figure 11:
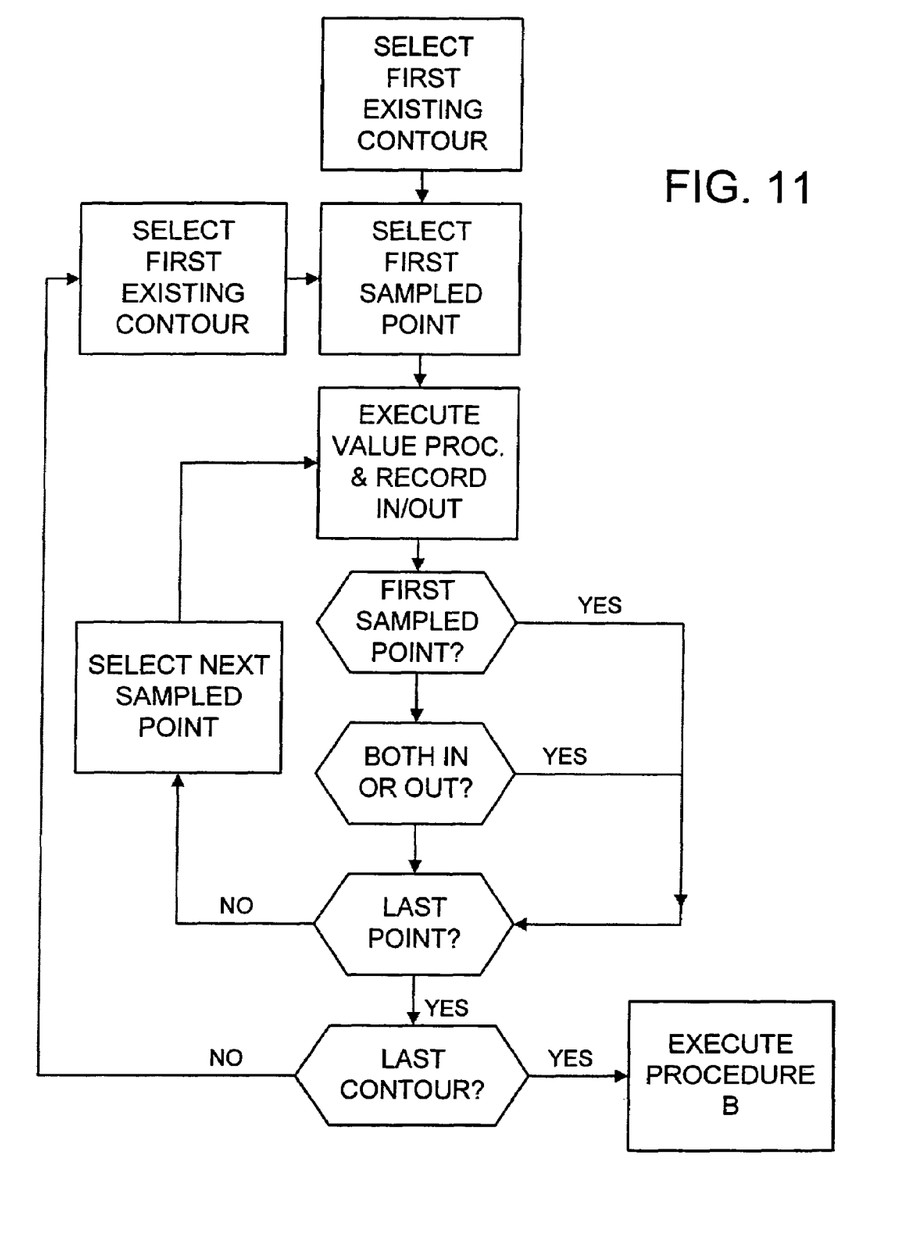
FIG. 11 is a flow chart illustrating Procedure A of the present invention.

Further procedures executed by the process of the invention are detailed below: Procedure A, illustrated in FIG. 11, is a procedure for evaluating sampled points on existing contours with new constraint contours. FIG. 2 illustrates in (two dimensions) a case in which crossings exist between two contours. The steps for this process begin with an initial sampling, wherein samples are evaluated using the appropriate constraint value function:
1. Select first existing contour 24;
2. Select first sampled point on this contour 25;
3. Execute the appropriate Value Procedure on this point and record if it is inside or outside the new constraint region 26 defined by contour 28;
4. If this is the first sampled point (i.e., 25) on this contour, go to step 7 of this procedure, below.
5. If this point and previous point are on the same side of the new constraint boundary contour 28, i.e. both are inside or both are outside of the new constraint region 26, go to step 7 of this procedure, below;
6. Use bisection search, as illustrated in FIG. 3, to determine interpolated crossing point between this and previous sampled points on this contour; Crossing points are indexed, as illustrated in FIGS. 4A and 4B in order to determine arc ordering
    6.1. Crossing point records contour on which it is found as well as this and previous sample points (i.e., sample number before and after crossing) as specified in step 5 of this procedure, above;
    6.2. Crossing point also records crossing direction (into or out of new constraint region 26), contour number in case of multiple existing contours, and its contour index on the new constraint contour using Index Procedure;
7. If this is not the last sampled point on this contour, select next sampled point in the direction of arrow A and go to step 3 of this procedure, above.
8. If this is not the last existing contour, select next contour and go to step 2 of this procedure, above.
9. Execute Procedure B (as more fully set forth, below).

Figure 12:
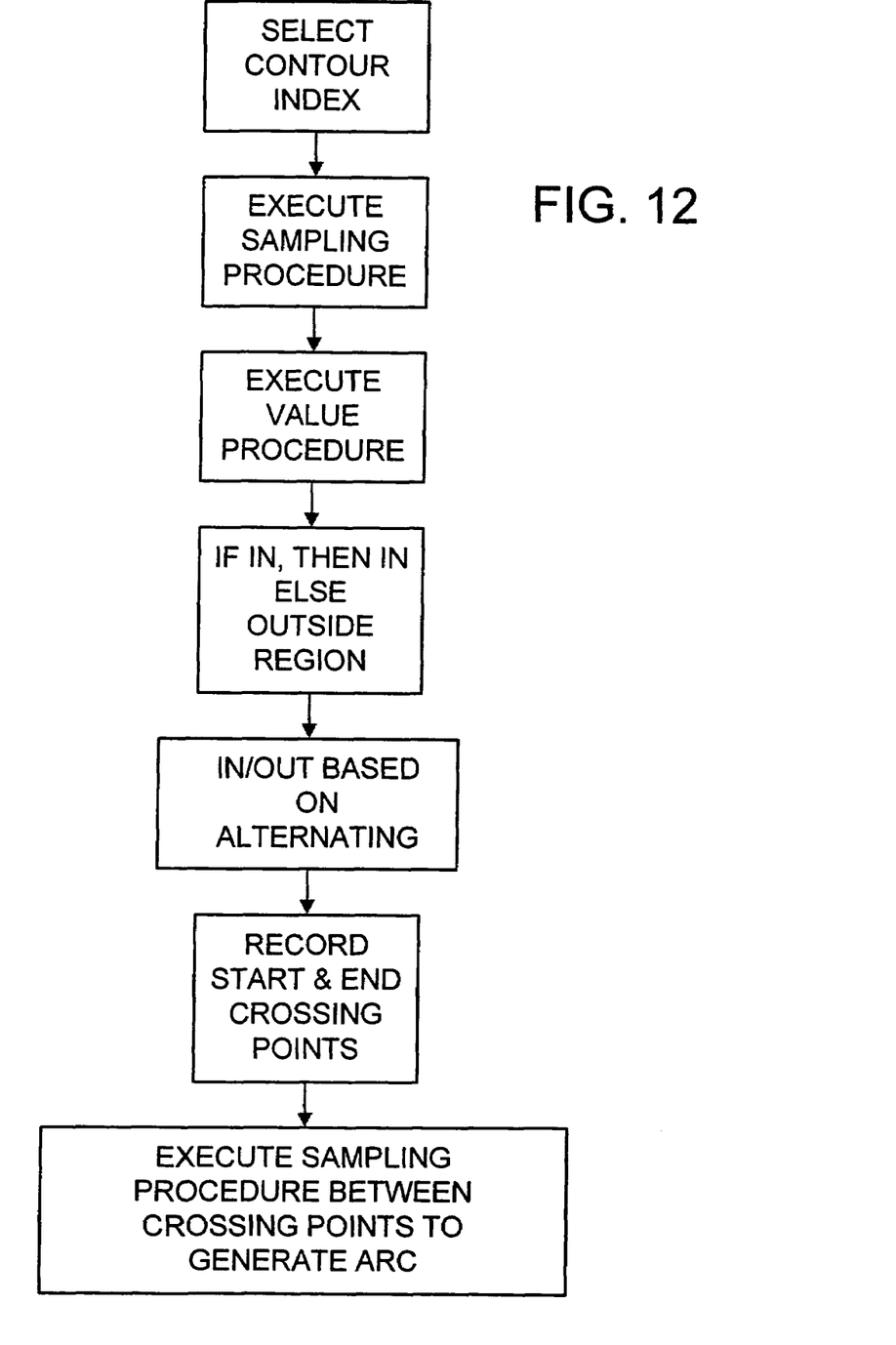
FIG. 12 is a flow chart illustrating Procedure B of the present invention.

Procedure B, illustrated in FIG. 12, is a procedure for sampling new constraint arcs to determine arc ordering, as illustrated in FIGS. 4A and 4B. The steps are as follows:
1. Select some contour index between indices of any two neighboring crossing points;
2. Execute the appropriate Sampling Procedure for this index generate sample test point on the new constraint contour;
3. Execute the appropriate Value Procedures of all previous constraints on this test point;
4. If the test point is inside all of the previous constraint regions, the arc between the selected crossing points is also inside, otherwise the arc is outside;
5. Using the fact that inside/outside conditions of neighboring arcs must alternate, do the following only for the arcs that are inside;
    5.1. Record start and end crossing points; and
    5.2. Execute the appropriate Sampling Procedure between contour indices of the crossing points to generate adequate sampling of the arc.

Figure 5:
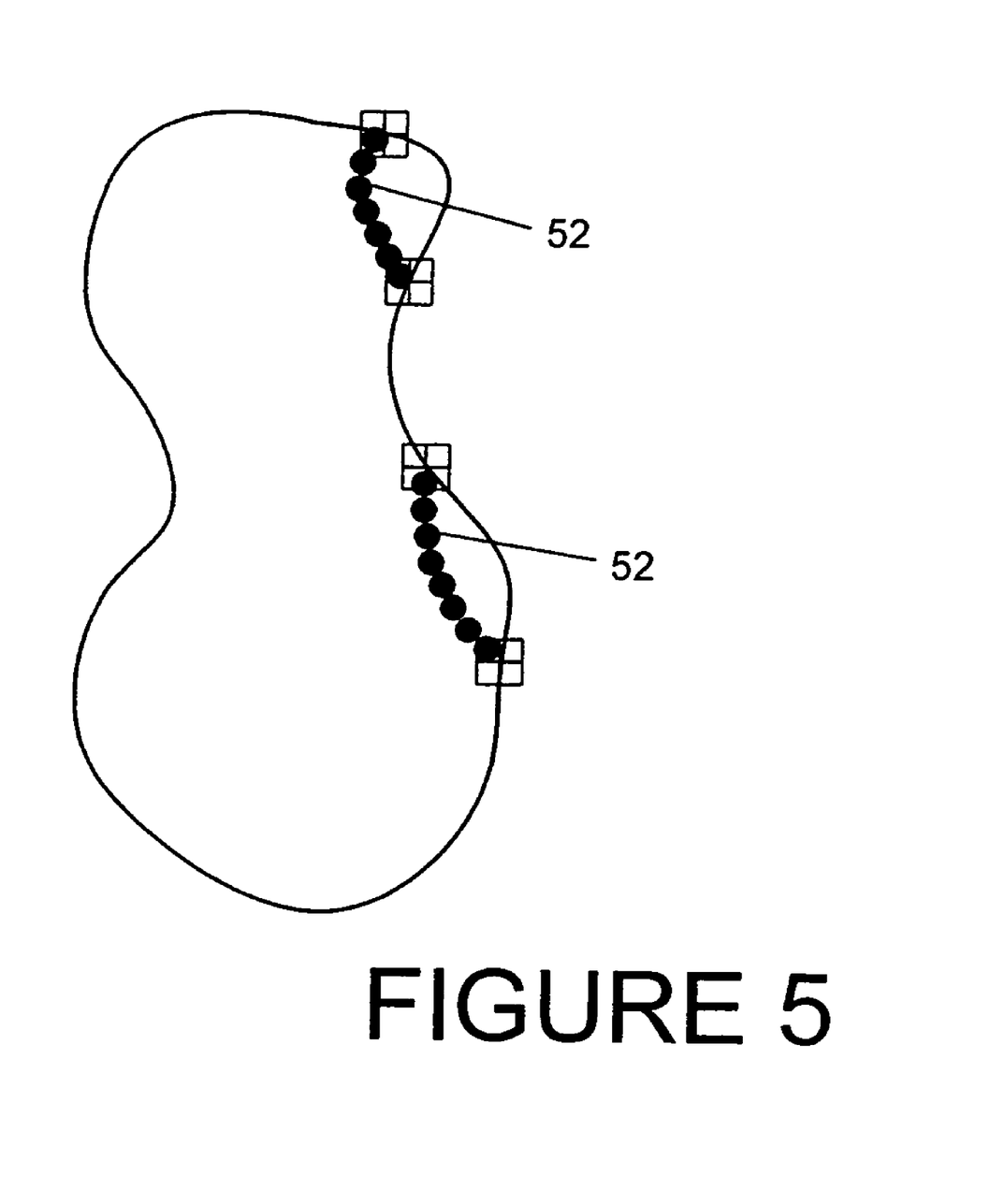
Figure 13:
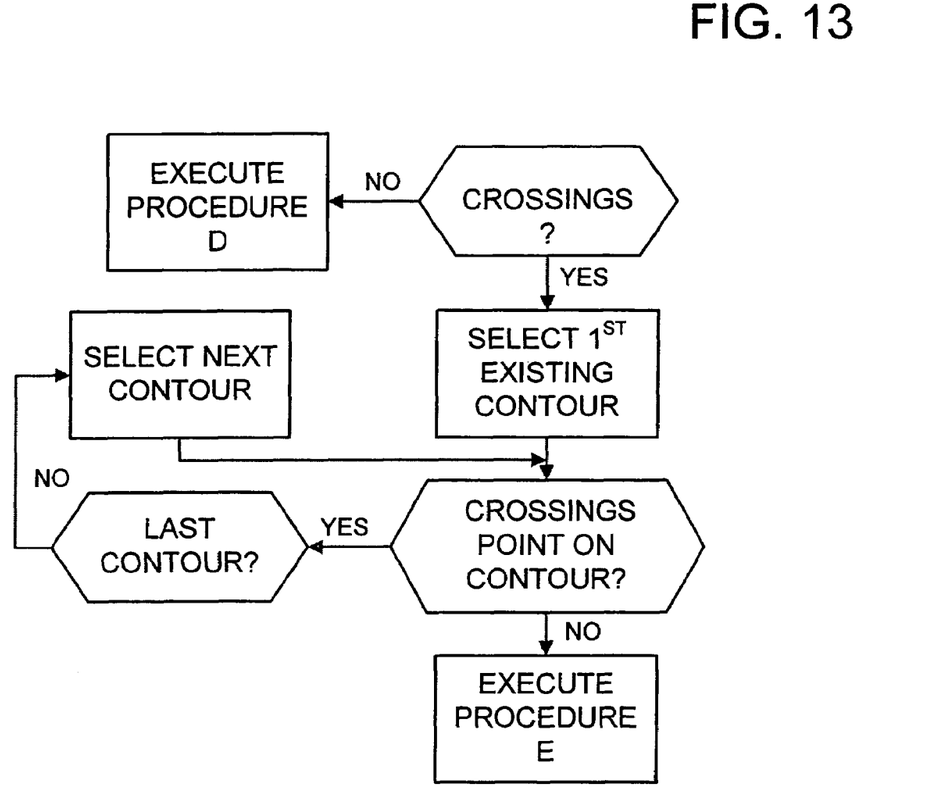
FIG. 13 is a flow chart illustrating Procedure C of the present invention.

Procedure C, illustrated in FIG. 13, is a procedure for creating new contours by combining existing contours with new constraint contour, as illustrated in FIG. 5. The procedure comprises the following:
1. If there are no crossings, execute Procedure D (as more fully set forth, below);
2. Select a first existing contour;
3. If there is a crossing point on this contour, go to step 5 of this procedure, below;
4. Execute Procedure E (as more fully set forth, below); and
5. If this is not the last contour, select next contour and go to step 3 of this procedure, above;
6. If there are crossings, execute Procedure F (as more fully set forth, below).

Figure 14:
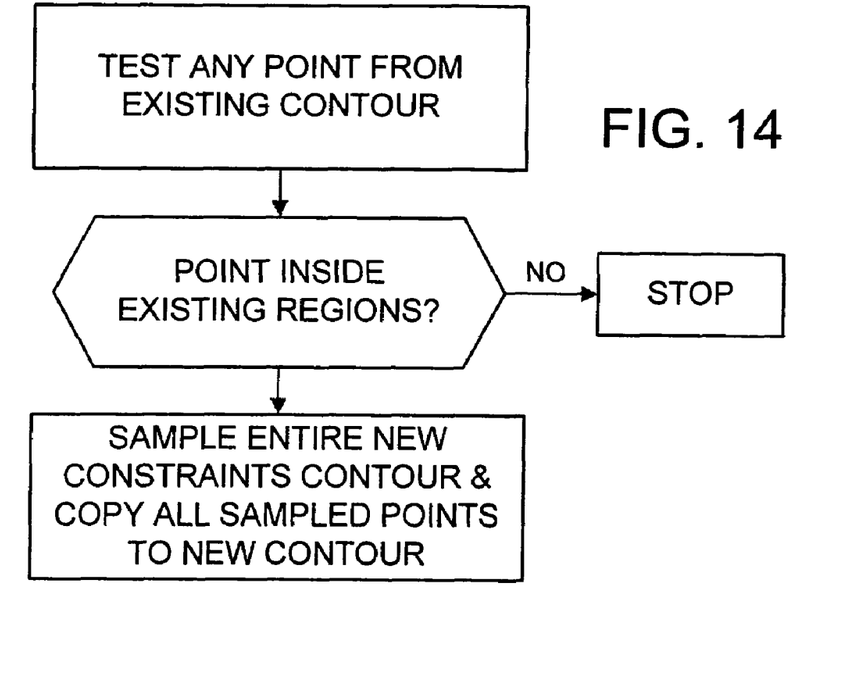
FIG. 14 is a flow chart illustrating Procedure D of the present invention.

Procedure D, illustrated in FIG. 14, is a procedure for creating a single new contour from new constraint contour that has no crossings. The procedure comprises the following:
1. Test any point from the new constraint contour;
    1.1. If the point is inside any of the existing regions, go to step 2 of this procedure, below, otherwise stop; and
2. The entire new constraint contour is inside, therefore, sample the entire new constraints contour and copy all sampled points to a new contour.

Figure 15:
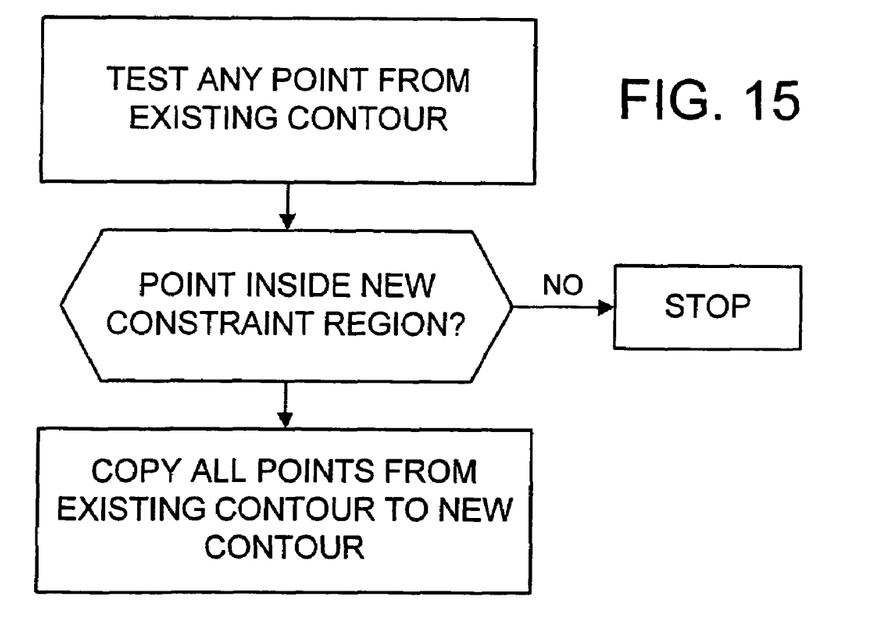
FIG. 15 is a flow chart illustrating Procedure E of the present invention.

Procedure E, illustrated in FIG. 15, is a procedure for creating a single new contour from existing contour that has no crossings. The procedure comprises the following:
1. Test any point from the existing contour;
    1.1. If the point is inside the new constraint region, go to step 2 of this procedure, below, otherwise stop; and
2. The entire existing contour is inside, therefore, copy all points from the existing contour to a new contour.

Figure 16:
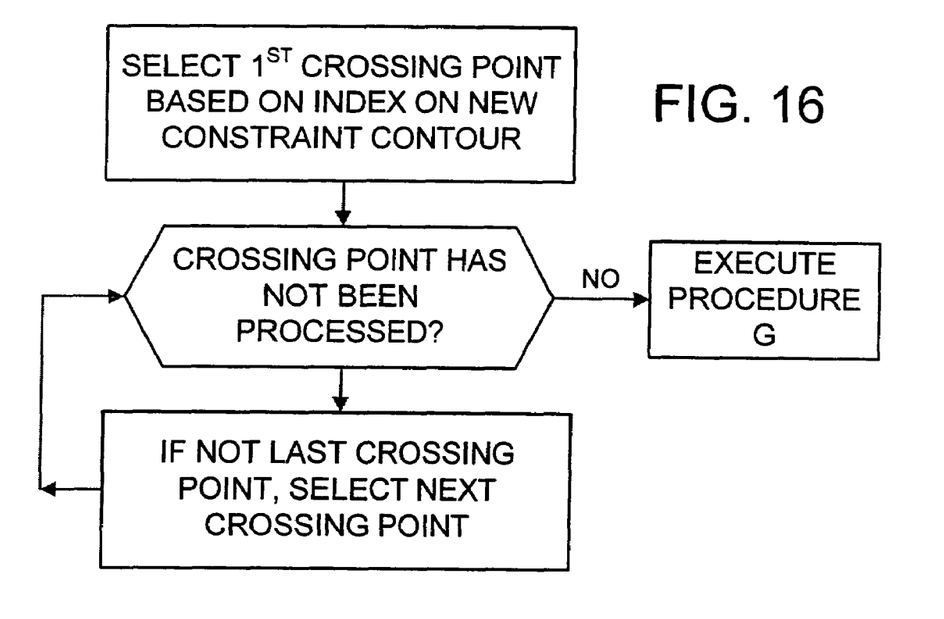
FIG. 16 is a flow chart illustrating Procedure F of the present invention.

Procedure F, illustrated in FIG. 16, is a procedure for creating new contours based on crossings. The procedure comprises the following:
1. Select a first crossing point based on its index on the new constraint contour;
2. If this crossing point has not been processed, execute Procedure G (as more fully set forth, below), otherwise continue to step 3 of this procedure, below; and
3. If this is not the last crossing point, select the next crossing point and go to step 2 of this procedure, above.

Figure 17:
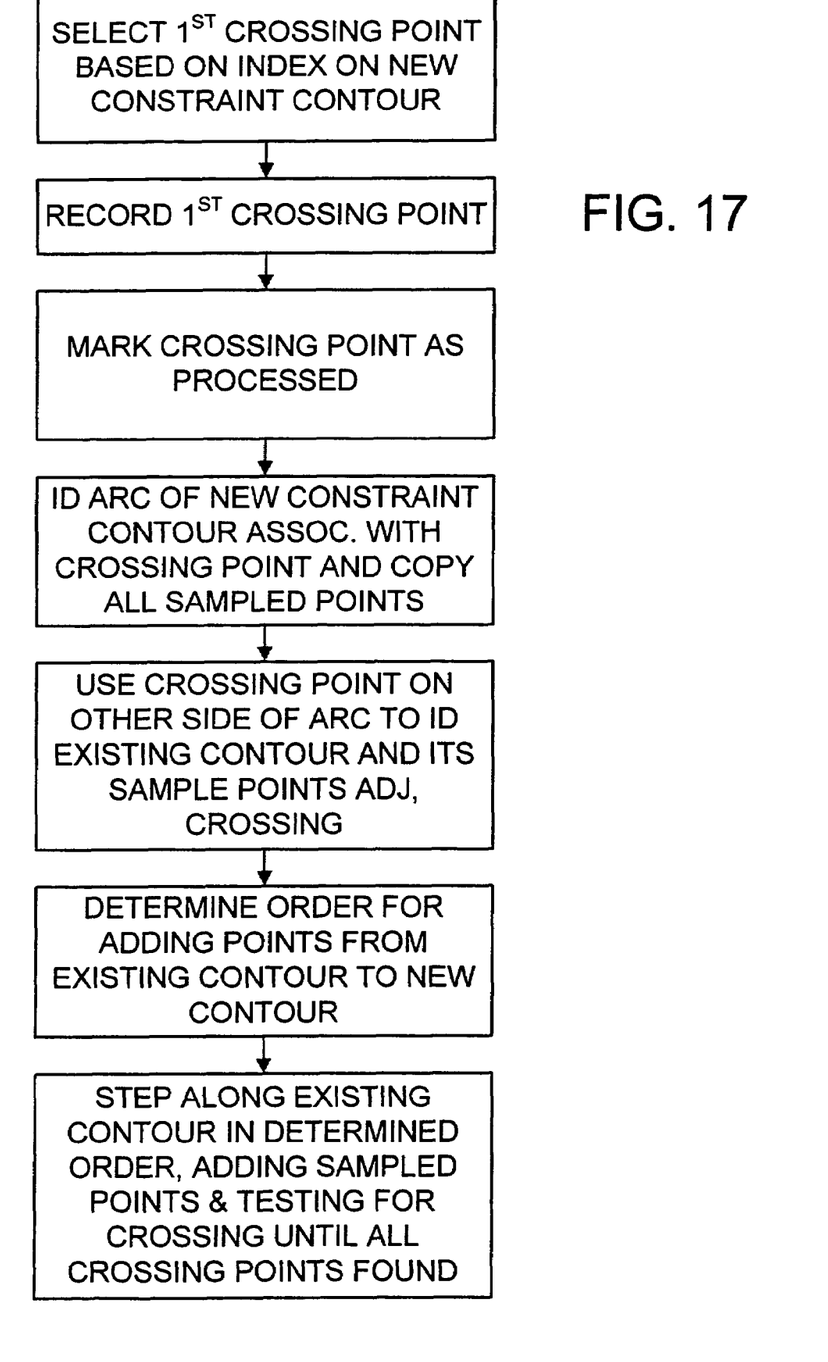
FIG. 17 is a flow chart illustrating Procedure G of the present invention.

Procedure G, illustrated in FIG. 17, is a procedure for creating a single new contour based on crossings. The procedure comprises the following:
1. Select a first crossing point based on its index on the new constraint contour;
2. Record the first crossing point;
3. Mark this crossing point as processed;
4. Identify arc of the new constraint contour associated with the crossing point and copy all its sampled points to a new contour;
    4.1. If this crossing point is identified as end point of the arc, copy points in reverse order;
5. Use crossing point on the other side of the arc to identify associated existing contour and its sample points before and after crossing;
6. Mark this crossing point as processed;
7. Determine the order in which points from the existing contour are added to the new contour;
    7.1. The order is reversed if sample point before crossing is inside new constraint region;
8. Step along the existing contour in the determined order; each step includes:
    8.1. Adding the sample point to the new contour; and 8.2. Testing if there is another crossing point on the same contour such that the just added sample point is equal to the sample point inside new constraint region associated with the crossing point;

9. If another crossing point is not found, return to step 8 of this procedure, above, otherwise continue to step 10 of this procedure, below.

10. If the found crossing point is equal to the first recorded crossing point, the new contour is closed, otherwise return to step 3 of this procedure, above.

FIGS. 2-5 illustrate the case (in 2D) for computing the FOV where crossings exist between an existing contour and a new constraint region. The initial sampling is shown in FIG. 2, wherein the existing contour is sampled starting at a zero sample. Each sample number is evaluated using the constraint value function to determine whether the sample is inside or outside of the new constraint.

Crossing detection is illustrated in FIG. 3, wherein interpolation is performed on the existing contour and the crossing is searched for using bisection. For crossing points, the sample number is recorded before and after the crossing, the crossing direction (into or out of the new region) is recorded, and the contour number is recorded in the case of multiple existing contours.

FIG. 4A illustrates a first portion of arc ordering in accordance with the present invention. The figure shows the zero index point for the new constraint contour, the index of crossing points on the new constraint contour, a test point on the new contour, and the direction of increasing index on the new constraint contour. The index of a crossing point is computed using the constraint boundary index function. Crossing points are ordered based on their index.

The arc length between crossing points is determined by differences between their indices measured in the direction of increasing index. The test point is located on an arc that has a larger than average length and is evaluated using value functions of all constraints processed before the new constraint. As shown in FIG. 4B, if the test point is "in," its arc is "in;" if the test point is "out," its arc is "out." In/Out conditions will alternate for neighboring arcs.

Arc sampling is illustrated in FIG. 5. In this procedure, the process samples all arcs that are "in" using constraint boundary sampling functions. Each arc is sampled between indices of its start and end crossing points. Each crossing point records an associated sampled arc and each arc records its start and end crossing points. In this manner, the visualization of the FOV can be determined based upon the constraints.

Figure 6:
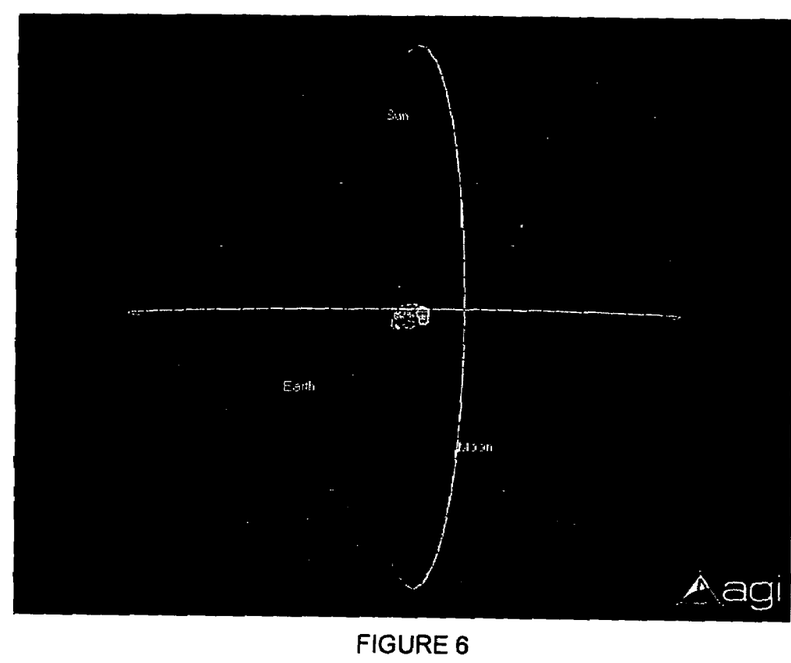
FIGS. 6-7 illustrate sample output in accordance with an embodiment of the invention, the output showing projections of the sensor FOV around the "attitude sphere" centered on its satellite.
Figure 7:
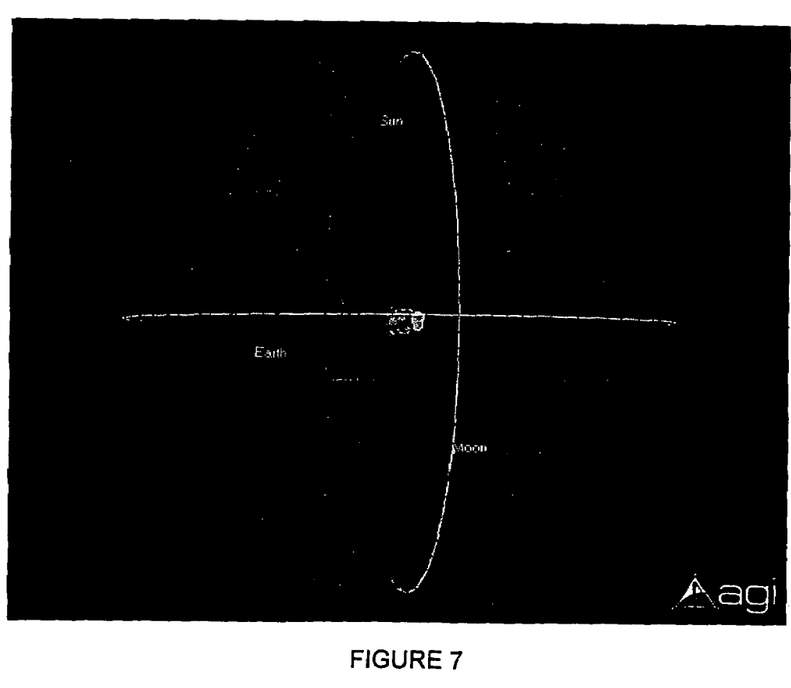

FIGS. 6-7 illustrate sample STKVO 6.0 output showing projections of the sensor FOV around the "attitude sphere" centered on its satellite. The projection is illustrated in green in this particular embodiment. The basic FOV is a simple cone, but there are two conical exclusions of different sizes around the Earth and the Moon that create notches in the original simple cone.

Figure 8:
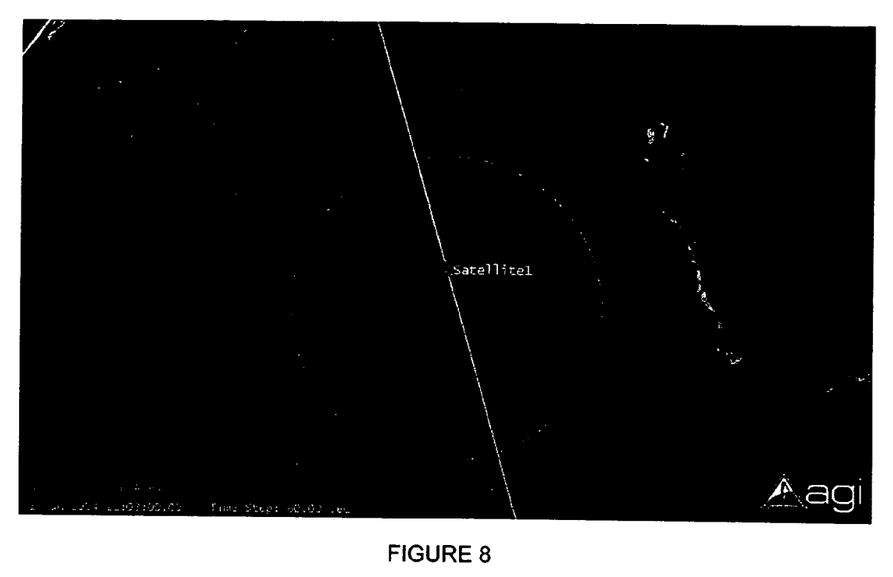
FIGS. 8-10 illustrate sample output in accordance with an embodiment of the invention, the output showing two other constraints at work with the projection shown on the ground.
Figure 9:
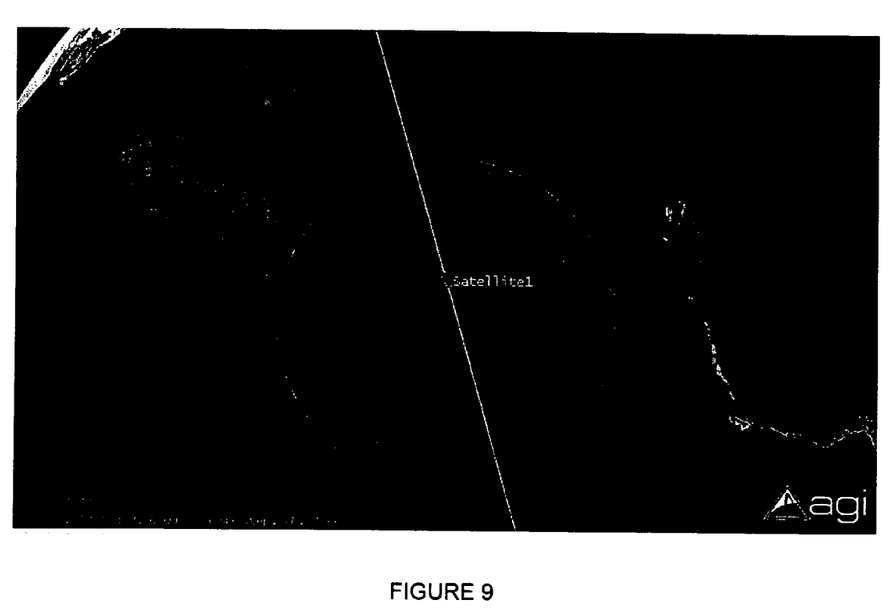
Figure 10:
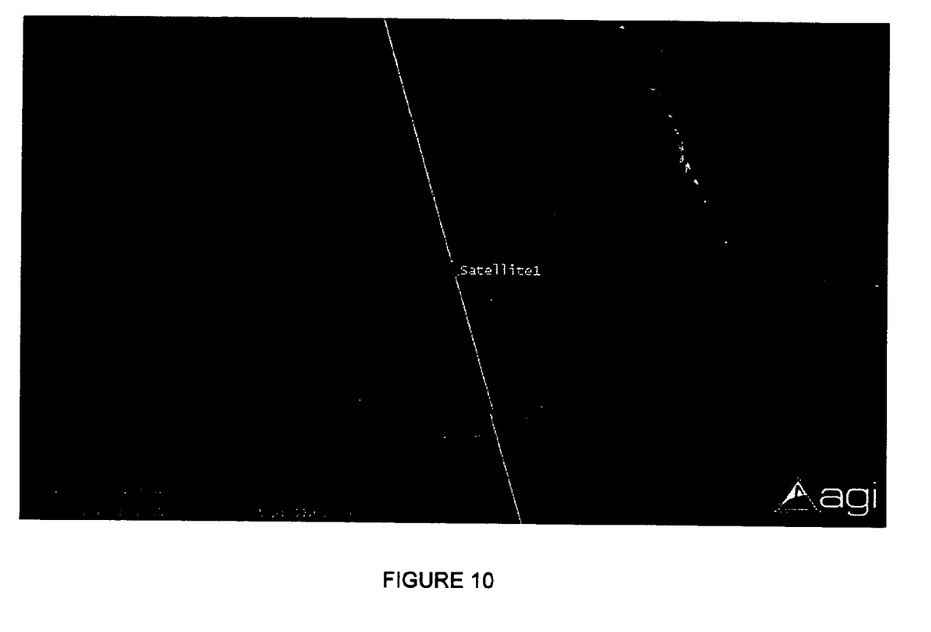

FIGS. 8-10 illustrate sample STKVO 6.0 output showing two other constraints at work. This time projection is shown on the ground. The green outline in this embodiment shows basic FOV without additional constraints. The red outline shows the same FOV limited further by two additional constraints: Cross Track Range and Squint Angle.

The method of the invention can be embodied in software, such as that provided by Analytical Graphic's STKVO 6.0, and can use any suitable computer readable medium, including but not limited to software stored on diskette, tape, CD-ROM, DVD-ROM, hard disk, flash memory, and DRAM.

In one embodiment, the present invention is to a method of visualizing field of view (FOV) constraints, comprising: computing effects of at least one constituent constraint upon a field of view; and visually displaying a representation of the effects of at least one constituent constraint upon the field of view, wherein the computing comprises: logically constructing a field of view comprised of a plurality of constituent constraints, each of which produces a single closed boundary contour with a constraint region either inside or outside of the closed boundary contour, evaluating sampled points on the contours for each of the plurality of constituent constraints to determine any arcs of contours that fall within constraint regions of other contours; and constructing a new contour defined by all arcs within the field of view, wherein visually displaying comprises displaying a graphical representation of the new contour, and wherein each constituent constraint further provides: a value procedure that determines if a given point is inside the constraint's region; an index procedure that returns a contour index for a given point, which is a real value that unambiguously encodes directions on the constraint's boundary contour; and a sampling procedure that returns an ordered array of sampled points that adequately capture an arc of the constraint's boundary contour between two specified contour indices. In another embodiment, the invention is drawn to a computer readable medium having computer readable instructions to perform the methods described above. In a variation of this embodiment, the FOV constraints are those of a sensor.

In another variation of this embodiment, the step of evaluating sampled points comprises: executing each constituent constraint's sampling procedure for the constituent constraint's entire boundary contour to create a contour for each constituent constraint; and for each pair of constituent constraint contours: evaluating sampled points on one contour with the other contour by executing the value procedure for each point on the one contour to determine if it is inside or outside the constraint region of the other contour; finding any crossing points of the pair of constituent constraint contours; and executing the sampling procedure on test points of the other contour between crossing points for portions within the one contour to provide an arc used for constructing the new contour.

In a further variation of one embodiment, the method further comprises the group of steps of: selecting a first constraint; executing the first constraint's sampling procedure for the entire boundary contour to create a first contour; selecting a next constraint; evaluating sampled points on the first contour with next constraint contour; sampling next constraint arcs to determine arc ordering; creating a new contour by combining the first contours with the new constraint contour; and redefining the new contour as the first contour and repeating this group of steps until there are no more constraints. Variations of this embodiment include evaluating sampled points on the first contour with next constraint contour with the further group of steps of: selecting a first existing contour; selecting a first sampled point on first existing contour; executing the corresponding value procedure on this point and recording if it is inside or outside the next constraint region; repeatedly selecting a next sampled point on the first existing contour and executing the corresponding value procedure on this point and recording if it is inside or outside the next constraint region until an area containing a crossing point is found by identifying adjacent points that fall on opposite sides of the next constraint region; using a bisection search to determine an interpolated crossing point on the next constraint region; indexing crossing points for use in arc ordering; and repeating this further group of steps for remaining existing contours. Another variation of this embodiment includes one wherein sampling next constraint arcs to determine arc ordering comprises: selecting a contour index between indices of any two neighboring crossing points; executing the corresponding sampling procedure for this index to generate a sample test point on the next constraint contour; executing value procedures of all previous constraints on this test point, wherein if the test point is inside all of the previous constraint regions, the arc between the selected crossing points is also inside, otherwise the arc is outside; and for the arcs that are inside, recording start and end crossing points; and executing the appropriate sampling procedure between contour indices of the crossing points to generate adequate sampling of the arc.

In another embodiment, the invention is drawn to a computer readable medium having computer readable instructions to perform the methods described above.

A method and computer readable medium (software) for providing visualization of sensor FOV constraints have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

I claim:

1. A method of visualizing field of view (FOV) constraints, comprising:
   computing effects of at least one constituent constraint upon a field of view; and
   visually displaying a representation of the effects of at least one constituent constraint upon the field of view,
      wherein the computing comprises:
         logically constructing a field of view comprised of a plurality of constituent constraints, each of which produces a single closed boundary contour with a constraint region either inside or outside of the closed boundary contour,
         evaluating sampled points on the contours for each of the plurality of constituent constraints to determine any arcs of contours that fall within constraint regions of other contours; and
      constructing a new contour defined by all arcs within the field of view,
      wherein visually displaying comprises displaying a graphical representation of the new contour, and
      wherein each constituent constraint further provides:
         a value procedure that determines if a given point is inside the constraint's region;
         an index procedure that returns a contour index for a given point, which is a real value that unambiguously encodes directions on the constraint's boundary contour; and
         a sampling procedure that returns an ordered array of sampled points that adequately capture an arc of the constraint's boundary contour between two specified contour indices.

2. The method of claim 1, wherein the FOV constraints are those of a sensor.

3. The method of claim 1, wherein evaluating sampled points comprises:
   executing each constituent constraint's sampling procedure for the constituent constraint's entire boundary contour to create a contour for each constituent constraint; and
   for each pair of constituent constraint contours:
      evaluating sampled points on one contour with the other contour by executing the value procedure for each point on the one contour to determine if it is inside or outside the constraint region of the other contour;
      finding any crossing points of the pair of constituent constraint contours; and
      executing the sampling procedure on test points of the other contour between crossing points for portions within the one contour to provide an arc used for constructing the new contour.

4. The method of claim 1, further comprising the group of steps of:
   selecting a first constraint;
   executing the first constraint's sampling procedure for the entire boundary contour to create a first contour;
   selecting a next constraint;
   evaluating sampled points on the first contour with next constraint contour;
   sampling next constraint arcs to determine arc ordering;
   creating a new contour by combining the first contours with the new constraint contour; and
   redefining the new contour as the first contour and repeating this group of steps until there are no more constraints.

5. The method of claim 4, wherein evaluating sampled points on the first contour with next constraint contour comprises the further group of steps of:
   selecting a first existing contour;
   selecting a first sampled point on first existing contour;
   executing the corresponding value procedure on this point and recording if it is inside or outside the next constraint region;
   repeatedly selecting a next sampled point on the first existing contour and executing the corresponding value procedure on this point and recording if it is inside or outside the next constraint region until an area containing a crossing point is found by identifying adjacent points that fall on opposite sides of the next constraint region;
   using a bisection search to determine an interpolated crossing point on the next constraint region;
   indexing crossing points for use in arc ordering; and
   repeating this further group of steps for remaining existing contours.

6. The method of claim 4, wherein sampling next constraint arcs to determine arc ordering comprises:
   selecting a contour index between indices of any two neighboring crossing points;
   executing the corresponding sampling procedure for this index to generate a sample test point on the next constraint contour;
   executing value procedures of all previous constraints on this test point, wherein if the test point is inside all of the previous constraint regions, the arc between the selected crossing points is also inside, otherwise the arc is outside; and
   for the arcs that are inside,
      recording start and end crossing points; and
      executing the appropriate sampling procedure between contour indices of the crossing points to generate adequate sampling of the arc.

7. A computer readable medium having computer readable instructions to perform a method of visualizing field of view (FOV) constraints, comprising:
   computing effects of at least one constituent constraint upon a field of view; and visually displaying a representation of the effects of at least one constituent constraint upon the field of view,
wherein the computing comprises:
  logically constructing a field of view comprised of a plurality of constituent constraints, each of which produces a single closed boundary contour with a constraint region either inside or outside of the closed boundary contour,
  evaluating sampled points on the contours for each of the plurality of constituent constraints to determine any arcs of contours that fall within constraint regions of other contours; and
  constructing a new contour defined by all arcs within the field of view,
  wherein visually displaying comprises displaying a graphical representation of the new contour, and
  wherein each constituent constraint further provides:
    a value procedure that determines if a given point is inside the constraint's region;
    an index procedure that returns a contour index for a given point, which is a real value that unambiguously encodes directions on the constraint's boundary contour; and
    a sampling procedure that returns an ordered array of sampled points that adequately capture an arc of the constraint's boundary contour between two specified contour indices.

8. The computer readable medium of claim 7, wherein the computer readable instructions for evaluating sampled points comprises:
  executing each constituent constraint's sampling procedure for the constituent constraint's entire boundary contour to create a contour for each constituent constraint; and
  for each pair of constituent constraint contours:
    evaluating sampled points on one contour with the other contour by executing the value procedure for each point on the one contour to determine if it is inside or outside the constraint region of the other contour;
    finding any crossing points of the pair of constituent constraint contours; and
    executing the sampling procedure on test points of the other contour between crossing points for portions within the one contour to provide an arc used for constructing the new contour.

9. The computer readable medium of claim 7, wherein the computer readable instructions further comprising instructions for executing the group of steps of:
  selecting a first constraint;
  executing the first constraint's sampling procedure for the entire boundary contour to create a first contour;
  selecting a next constraint;
  evaluating sampled points on the first contour with next constraint contour;
  sampling next constraint arcs to determine arc ordering;
  creating a new contour by combining the first contours with the new constraint contour; and
  redefining the new contour as the first contour and repeating this group of steps until there are no more constraints.

10. The computer readable medium of claim 9, wherein the computer readable instructions for evaluating sampled points on the first contour with next constraint contour comprises instructions for executing the further group of steps of:
  selecting a first existing contour;
  selecting a first sampled point on first existing contour;
  executing the corresponding value procedure on this point and recording if it is inside or outside the next constraint region;
  repeatedly selecting a next sampled point on the first existing contour and executing the corresponding value procedure on this point and recording if it is inside or outside the next constraint region until an area containing a crossing point is found by identifying adjacent points that fall on opposite sides of the next constraint region;
  using a bisection search to determine an interpolated crossing point on the next constraint region;
  indexing crossing points for use in arc ordering; and
  repeating this further group of steps for remaining existing contours.

11. The computer readable medium of claim 9, wherein the computer readable instructions for sampling next constraint arcs to determine arc ordering comprises:
  selecting a contour index between indices of any two neighboring crossing points;
  executing the corresponding sampling procedure for this index to generate a sample test point on the next constraint contour;
  executing value procedures of all previous constraints on this test point, wherein if the test point is inside all of the previous constraint regions, the arc between the selected crossing points is also inside, otherwise the arc is outside; and
  for the arcs that are inside,
    recording start and end crossing points; and
    executing the appropriate sampling procedure between contour indices of the crossing points to generate adequate sampling of the arc.

* * * * *